July 2, 1940.  W. W. BROWN  2,206,630
FISHING FLOAT
Filed Sept. 7, 1939

William W. Brown
INVENTOR

BY Victor J. Evans & Co.
ATTORNEYS

Patented July 2, 1940

2,206,630

UNITED STATES PATENT OFFICE 2,206,630

FISHING FLOAT

William W. Brown, Warren, Ind.

Application September 7, 1939, Serial No. 293,809

2 Claims. (Cl. 43—49)

This invention relates to fishing floats and more particularly to means for attaching a line or leader to a float.

An object of the invention is to provide a fishing float that may be used on a fine line or a gut leader without wear or injury thereto.

Another object is to provide a float that may be easily and quickly attached, removed or adjusted to any desired fishing depth.

Another object is to provide a float that will not slip or become displaced on a line or leader during fishing operation and one that will be positively held in the desired position until removed or adjusted by the operator.

A further object is to provide a float having a flexible yet relatively non-breakable stem, and still retain the buoyancy existing in floats now in use.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1:
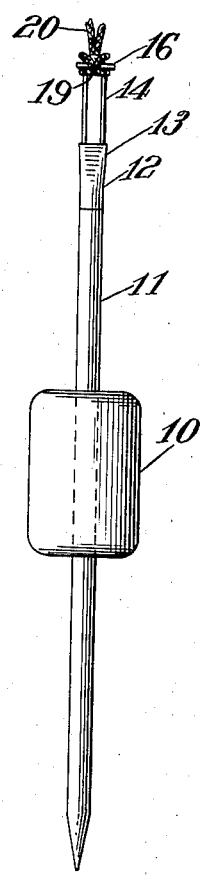
Figure 1 is a front elevation of a float constructed in accordance with the invention showing a line attached thereto.
Figure 3:
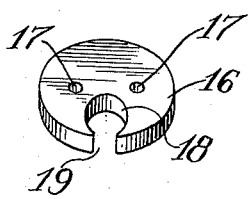
Figure 3 is a detail perspective view of the grip washer.

Referring now to the drawing in which like characters of reference designate similar parts in the various views, 10 designates a float having a stem 11 extending through the axis thereof. The upper end of the stem has screwed on thereto a sleeve 12 having flattened mouth 13. A wire loop 14 is secured at one end to the sleeve, and for this purpose the ends 15 of the loop may be bent at a right angle to the sides of the loop, and forced into the bottom of the flared mouth 13 of the sleeve to bear against the end of the stem 11.

A grip washer 16 is provided with a pair of openings 17 to slidably receive the sides of the wire loop. A substantial circular recess 18 is formed in the washer between the openings 17, the recess 18 opening through the edge of the washer through a comparatively narrow slot 19.

Figure 2:
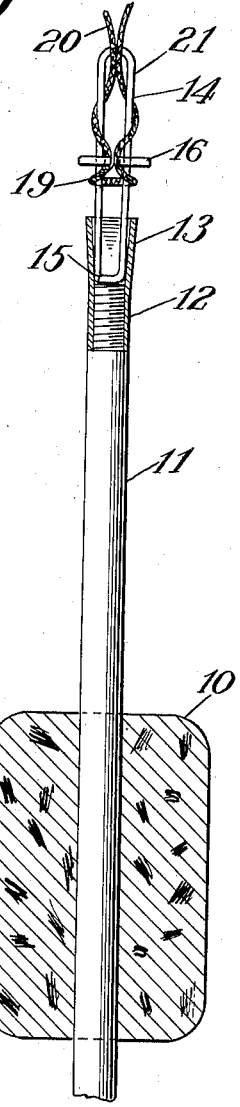
Figure 2 is a longitudinal sectional view of the float, drawn to large scale, and showing the preliminary stage of attaching the line.

In operation the line 20, or leader, is first bent upon itself to form a short loop which is directed through the wire loop, then the line or leader is looped about the wire loop above the washer then passed into the opening 18 through the slot 19 then looped about the wire loop below the washer. Then the washer is moved in the direction of the free end 21 of the wire loop to shorten the looped portion of the wire from the condition shown in Figure 2 to the condition shown in Figure 1 and thus knot the line, or leader, yieldably on the wire loop 14.

In practice the line is not pinched but automatically tightens itself, the harder the pull upon the line the tighter the same is secured to the wire loop and washer. Also the washer holds the line positively without injuring the line.

Preferably the stem 11 is formed of a light strong plastic material such as Bakelite instead of the usual bamboo or wood stem so that the long life and durability of the float is promoted.

It will be pointed out that by simply backing the washer down along the sides of the wire loop 14 the looped line may be slackened and disengaged easily from the opening 18 so that the float may be readily adjusted to the required fishing depth.

From the above description it is thought that the construction and operation of the invention will be fully understood without further explanation.

What is claimed is:

1. The combination with a float having a stem, of a wire loop secured at one end to the stem, and a grip washer slidably mounted upon the loop and provided with a line or leader receiving recess in one side, a loop of the line or leader being adapted to be passed through said wire loop then through said recess and looped about the wire loop above and below the grip washer, and the washer being adapted to be moved in the direction of the free end of the wire loop to clamp the line or leader to the wire loop.

2. The combination of a float having a stem formed of plastic material, of a sleeve carried by said stem, a wire loop secured to said stem by said sleeve, and a grip washer slidably mounted upon the loop and provided with a line or leader receiving recess in one edge, a loop of the line or leader being adapted to be passed through said wire loop then through the recess and looped about the wire loop above and below the grip washer, and the washer being adapted to be moved in the direction of the free end of the wire loop to clamp the line or leader to the wire loop.

WILLIAM W. BROWN.